Aug. 4, 1931.   T. B. NISBET   1,817,577
WINDSHIELD AND SUPPORT THEREFOR
Original Filed Oct. 23, 1926   2 Sheets-Sheet 1
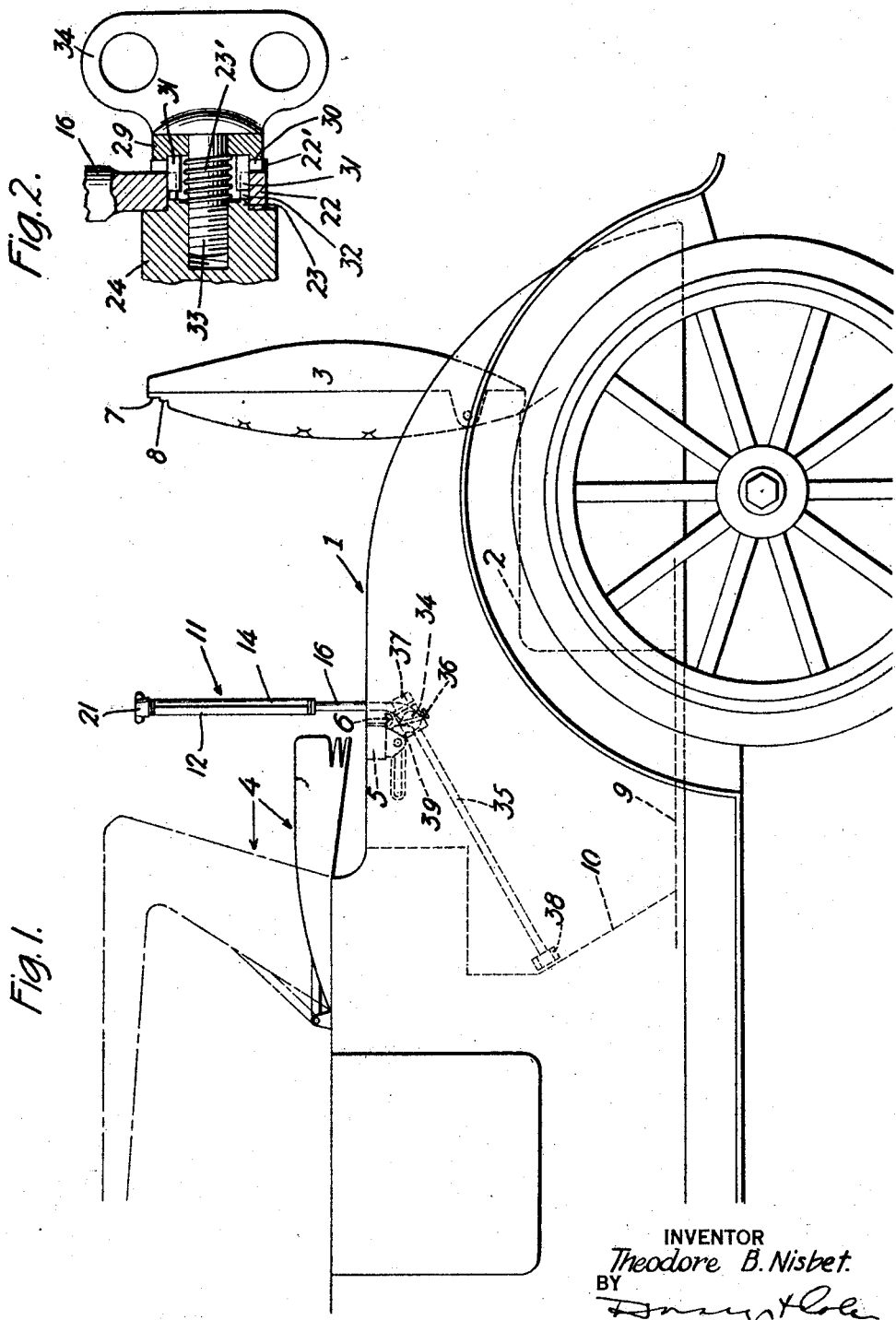
INVENTOR
Theodore B. Nisbet.
BY
ATTORNEYS

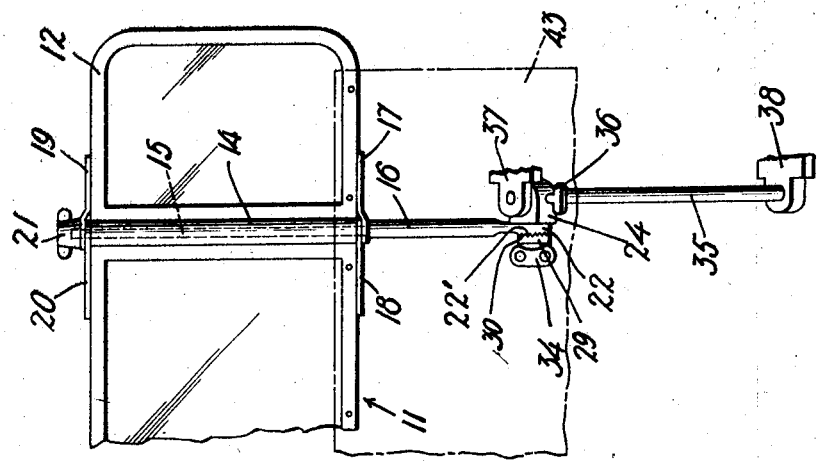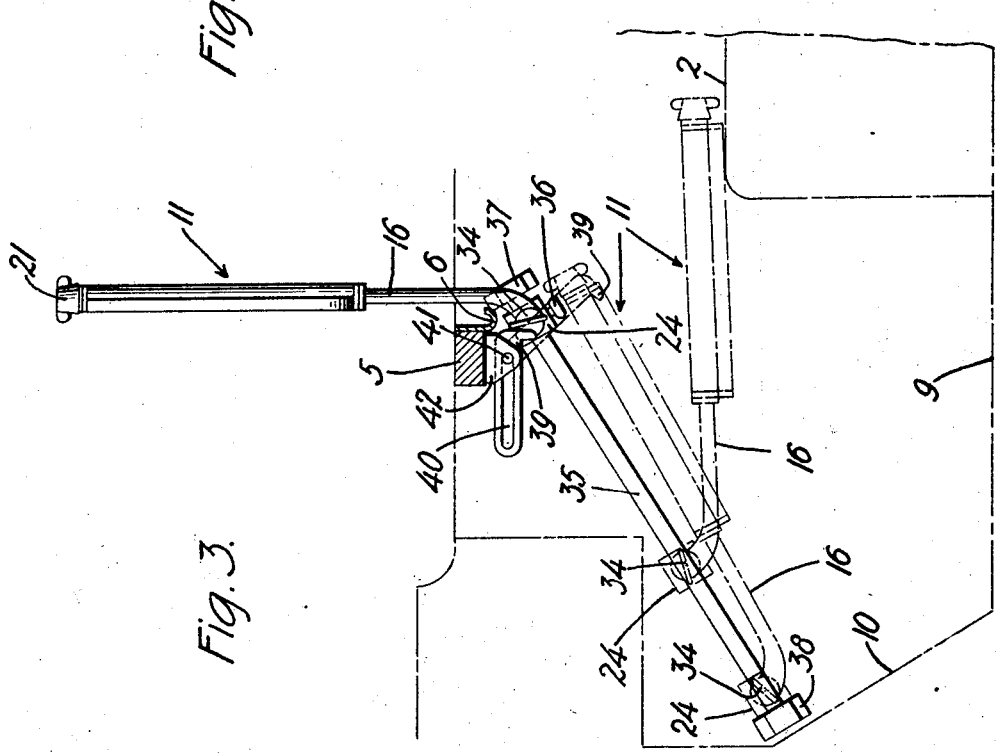

Patented Aug. 4, 1931

1,817,577

UNITED STATES PATENT OFFICE

THEODORE B. NISBET, OF IRVINGTON, NEW YORK

WINDSHIELD AND SUPPORT THEREFOR

Original application filed October 23, 1926, Serial No. 143,627. Divided and this application filed April 2, 1928. Serial No. 266,750.

This invention relates to wind shields and supports therefor and more particularly to wind shields and wind shield supports adapted to protect occupants of an automobile seat, such for example as a rumble seat, and also adapted for ready adjustment either to a position for use or to a position in which they will be out of the way when not in use. This case is a division of my co-pending applications Ser. No. 143,627, filed October 23, 1926, and Ser. No. 199,799, filed June 18, 1927, and relates more particularly to the embodiment of the invention illustrated in Figs. 13 and 14 of each of said co-pending applications.

Heretofore provision has been made in passenger car bodies, such as automobile bodies, of wind shields and wind shield supports adapted for adjustment into position to protect the occupants of a seat or for adjustment into ineffective position, for example, in an automobile, into folded position at the back of a forward seat. Such devices are not, however, suitable for use in connection with certain passenger carrying bodies, such as rumble seat bodies of automobiles, in which the space available to receive the wind shield structure when not in use, is not only small but shallow.

An important object of the present invention is to provide an improved structure for wind shield supports, of simple construction and capable of ready adjustment to effective and out-of-the-way positions and of being secured in such positions. Another object of the invention is to provide a structure of the class described which is adapted for use with a rumble seat or a rearward seat so as to be of sufficient height when in use and capable of storage in front of the seat.

Other objects and advantages will appear upon consideration of the following description and of the drawings in which:

Figure 1 is a diagrammatic side elevation of a portion of an automobile having one embodiment of my invention applied thereto;

Figure 2 is a fragmentary view, partly in section, of means for adjustably securing parts of the wind shield in desired position with respect to each other;

Figure 3 is a view in side elevation illustrating in full lines the position of the parts when the wind shield is in use and, in dot-and-dash lines, the position of the parts when the wind shield is placed in the car body, as well as indicating the manner in which the wind shield is shifted from one position to the other; and Figure 4 is a fragmentary rear elevation of the structure shown in Figure 3.

In Figure 1, the invention is illustrated as applied to an automobile having a body 1 provided with a front portion in which the driver sits, a rumble seat 2, and a pivotally supported cover 3 adapted to close the rumble seat opening in the deck and, when swung rearwardly to open position, to form a back for the rumble seat. The part in which the driver sits may be covered by a top 4 which, when desired, may be lowered to the full line position, Figure 1, in which it extends rearwardly to about the front edge of the rumble seat opening.

In the top of the body 1 at the forward edge of the rumble seat opening there may be provided supporting means such as a wooden cross bar 5 along which there is a metal trough 6 which may be continued along the side edges of the rumble seat opening. It should be understood, however, that in some cases there is no wooden cross bar in the automobile body and the wind shield structure and the trough are secured to the body in any suitable manner. At its upper or forward edge the rumble seat cover 3 is provided with a notch 7 and a strip 8 of rubber or similar material, which engages the edge of the trough 6 when the cover 3 is in position to close the rumble seat opening.

At the front of the rumble seat 2, the compartment therefor may extend beneath the deck and downwardly to a floor 9. Substantially at the lower surface of the automobile body 1 and at the front of the floor 9 there may be an inclined portion 10 adapted to serve as a foot rest and, above the inclined portion 10, the compartment may be shaped to conform in general to the shape of the seat in the front part of the car. Of course, the construction and arrangement of these parts may vary for different machines.

Occupants of the rumble seat may be shielded by means of a main wind shield 11 provided with right and left hand wing shields 12 (only the right hand shield 12 being shown in Fig. 4) hinged to the main wind shield so that they can be turned to the proper angle with respect thereto and may be folded flat against the rear face of said main wind shield 11.

To prevent the passage of air between the wind shields 12 and the main wind shield 11, these parts are connected by means substantially the same as shown in my Reissue Patent No. 14,872, dated June 1, 1920. In each case, the opening between the wing shields and the main shield is closed, as will be described with reference to the parts shown in Figure 4, by means of a tube 14 filling the space between the main shield and the wing shield and a rod 15 forming a reduced extension of a member 16 and passing through hinge members 17 and 18 at the lower end of the tube 14 and through brackets 19 and 20 at the upper end of the tube 14, the brackets 18 and 20 being secured to the wind shield 11 and brackets 17 and 19 being secured to the wing shield 12. The upper end of the rod 15 extends into a wing nut 21 which when tightened causes the brackets 17, 18, 19 and 20 to be pressed towards the corresponding ends of the tube 14 so as to hold the wing shield 12 in any desired angular position with reference to the wind shield 11.

At its lower end the member 16 is formed with a perforated collar 22 having ratchet teeth 22' at its left hand side, as seen clearly in Figure 2 in which the device is viewed from the side opposite to that shown in Fig. 4. This collar 22 fits over an annular projection 23 at the right hand face (Fig. 2) of a supporting member 24 to be described more fully hereinafter. The collar 22 is held in position on the annular projection 26 by means of a washer 29 having at its left hand side (Fig. 2) ratchet teeth 30 to cooperate with the ratchet teeth 22' and having keys 31 extending into slots 32 in the annular projection 23. In assembling these parts, the collar 22 is first placed over the annular projection 23, a spring 23' is inserted in the annular projected portion of the head 24, the washer 29 is placed in position with the keys 31 extending into the slots 32 and then the threaded portion 33 of a wing screw 34 is passed through the washer 29 and the collar 22, and screwed into the head 24.

It will be apparent that due to the engagement of the ratchet teeth 22' and 30 the collar 22 will be locked against movement relative to the washer 29, which due to the engagement of the keys 31 in the slots 32 is held against angular movement with reference to the supporting member or block. It should be understood that the parts of the left hand side of the wind shield 11 are substantially the same as those at the right hand side, but that certain of the parts are reversed in position with reference to those at the left hand side.

The members or blocks 24 are slidably mounted on forwardly and downwardly extending rods 35 and secured in adjusted position thereon by set screws 36, the rods 35 being secured to the body 1 by any suitable means such as upper brackets 37 and lower brackets 38.

The wind shield 11 may be shifted from the effective position shown in full lines in Figure 3 to the lower position (shown in dot-and-dash lines) along the rods 35 in the following manner. The wing shields are folded against the rear face of the main wind shield 11 and secured in such positions by tightening the wing nuts 21. Then the wing screws 34 are loosened and the wind shield is swung rearwardly as far as desired. The wind shield may be swung rearwardly and the blocks 24 slid along the rods 35 far enough to position the wing shield with its upper edge resting on the seat 2 and the wind shield may be secured in this position by tightening the thumb screws 34 and 36. The position of the wind shield on the seat may be varied by adjustment of the blocks 24 along the guides 35.

Preferably the wind shield, when not in use, is positioned along the rods 35 and in order to do this, said wind shield after being swung to the rear from its upright position is moved forwardly and downwardly until the blocks 24 engage the lower brackets 38, the upper edge of the wind shield being then secured in position by means of a hook 39 provided with a slot 40 through which passes a pivot or pin 41 supported by brackets 42. If desired the set screws 36 may then be tightened, but this may be unnecessary as the hook 39 will hold the wind shield securely in position.

It will be seen that, when the wind shield 11 is in position for use, there is usually a gap between its lower edge and the upper surface of the car body at the front of the rumble seat opening. Protection for the occupants of the rear seat may be obtained by a curtain or robe 43 secured in any suitable manner to the wind shield 11 and wing shields 12 at their lower edges.

Although the invention is more particularly designed for use in connection with rumble seats of automobiles, it should be understood that the invention is of such scope as to apply to any structure in which similar requirements are to be met, as for example in a small touring car in which a wind shield is merely folded at the back of the front seat and could not be swung down past the front edge of the rear seat. In fact, the invention readily adjusts itself for use as a tonneau wind shield for substantially all purposes, and the invention is also adapted for use in protecting persons in water or air craft.

It should also be understood that there may be considerable variation in the manner of releasing and tightening the various screws and also in the steps of shifting the wind shields from effective to ineffective positions and vice versa.

The foregoing detailed description has been given for clearness of understanding and no undue limitation should be deduced therefrom, but the appended claim should be construed as broadly as possible in view of the prior art.

Having thus described my invention, I claim:

In an automobile body having a rumble seat in a rumble seat compartment, the combination of a wind shield, wind shield supporting means pivoted to the wind shield near its lower edge, downwardly and forwardly inclined guides for said supporting means secured to said body adjacent to the forward edge of the opening of the rumble seat compartment and at their lower ends, means for securing said supporting means in adjusted position along said guides, and means to engage the shield at its upper edge and hold it when the shield has been lowered along said guides, including a pivot fixed to said body at the front of the rumble seat opening, and a shield-engaging hook having a longitudinal slot receiving said pivot and permitting said hook to be shoved back when not in use.

THEODORE B. NISBET.